United States Patent
Afshari et al.

(10) Patent No.: US 8,604,893 B2
(45) Date of Patent: Dec. 10, 2013

(54) ELECTRICAL PRISM: A HIGH QUALITY FACTOR FILTER FOR MILLIMETER-WAVE AND TERAHERTZ FREQUENCIES

(75) Inventors: Ehsan Afshari, Newfield, NY (US); Omeed Momeni, Ithaca, NY (US)

(73) Assignee: Cornell University, Ithaca, NY (US)

( * ) Notice: Subject to any disclaimer, the term of this patent is extended or adjusted under 35 U.S.C. 154(b) by 808 days.

(21) Appl. No.: 12/744,869

(22) PCT Filed: Dec. 22, 2009

(86) PCT No.: PCT/US2009/069261
§ 371 (c)(1),
(2), (4) Date: May 26, 2010

(87) PCT Pub. No.: WO2011/078857
PCT Pub. Date: Jun. 30, 2011

(65) Prior Publication Data
US 2011/0215881 A1    Sep. 8, 2011

(51) Int. Cl.
*H03H 7/46* (2006.01)
*H03H 5/00* (2006.01)

(52) U.S. Cl.
USPC ............................................. 333/132; 333/169

(58) Field of Classification Search
USPC ........................ 333/169, 132, 134, 136, 172
See application file for complete search history.

(56) References Cited

U.S. PATENT DOCUMENTS

| | | | |
|---|---|---|---|
| 6,557,154 B1 * | 4/2003 | Harada et al. ................. | 716/115 |
| 7,456,704 B2 * | 11/2008 | Afshari et al. ................ | 333/124 |
| 7,546,091 B2 | 6/2009 | Murakami et al. | |
| 7,566,952 B2 * | 7/2009 | Floyd et al. ................... | 257/665 |
| 7,777,594 B2 * | 8/2010 | Eleftheriades ................ | 333/134 |
| 8,085,109 B2 * | 12/2011 | Afshari et al. ............... | 333/24 R |

FOREIGN PATENT DOCUMENTS

| | | |
|---|---|---|
| JP | 63-067009 | 3/1988 |
| KR | 10-2008-0100663 | 11/2008 |

OTHER PUBLICATIONS

Omeed Momeni, et al.; Electrical Prism: a High Quality Factor Filter for mm Wave and Terahertz Frequencies; Cornell University, Ithaca, NY 14853; Dec. 16-20, 2008, Microwave Conference, 2008. APMC 2008. Asia-Pacific.
International Search Report and Written Opinion from counterpart application No. PCT/US2009/069261; report dated Aug. 24, 2010.
Omeed Momeni et al.; Electrical Prism: A High Quality Factor Filter for Millimeter-Wave and Terahertz Frequencies; IEEE Transactions on Microwave Theory and Techniques. Nov. 2009, vol. 57, No. 11, pp. 2790-2799.

* cited by examiner

*Primary Examiner* — Dean O Takaoka
*Assistant Examiner* — Alan Wong
(74) *Attorney, Agent, or Firm* — Miller, Matthias & Hull LLP

(57) ABSTRACT

Filters and methods which may be used with millimeter-wave and terahertz frequency range are disclosed. The filter is formed as an electrical prism which may include a first lattice forming an interface with a second lattice. Each lattice may include a plurality of passive elements, such as inductors, capacitors, and the like. The first lattice may include an input disposed at an input boundary thereof, while the second lattice may include an output disposed at an output boundary thereof. Furthermore, the first and second lattices may be configured to receive a signal at the input of the first lattice, propagate the signal to the interface, and direct the signal to the outputs of the second lattice.

20 Claims, 10 Drawing Sheets

ELECTRICAL PRISM: A HIGH QUALITY FACTOR FILTER FOR MILLIMETER-WAVE AND TERAHERTZ FREQUENCIES

CROSS-REFERENCE TO RELATED APPLICATION

This is a 35 USC §371 National Stage Filing of International Patent Application No. PCT/US09/69261 filed on Dec. 22, 2009.

FIELD OF THE DISCLOSURE

The present disclosure relates to filters for electrical signals, and more particularly, to an apparatus and method for providing a high quality factor filter which may be used with signals of millimeter-wave and terahertz frequencies.

BACKGROUND OF THE DISCLOSURE

Terahertz systems, or systems operating in the terahertz frequency range from approximately 100 GHz to 10 THz, are increasingly employed in various applications. Among the first of such applications include bio-spectroscopy and molecular spectroscopy applications. More currently, terahertz systems are increasingly being employed in imaging applications, compact range radars and remote sensing applications. The solid-state realization of such systems, as well as the terahertz sources, have typically been built using heterojunction bipolar transistor (HBT) and high electron mobility transistor (HEMT) technologies, based on III-V semiconductors, or semiconductors comprising Group III and Group V elements, such as GaAs. As the complementary metal-oxide semiconductor (CMOS) technology scales down, the maximum operating frequency, $f_{max}$, of the transistors reach the lower end of the terahertz range. For example, 65 nm CMOS technology has already reached an $f_{max}$ of approximately 200 GHz. The downscaling of CMOS technologies along with the drawbacks in cost and efficiency that are associated with III-V semiconductor technologies have inspired more recent terahertz work in silicon processes.

In order to realize terahertz systems using integrated circuits, solid-state terahertz sources having nonlinear elements may be used for up/down conversion and multiplications to generate power. However, the use of nonlinear devices may generate undesirable harmonics which adversely affect the resulting spectrum. Accordingly, high quality factor filters are used to suppress such harmonics. In terahertz spectroscopy, for instance, a high quality factor filter bank is used to find the output spectrum. This is typically done off-chip by mixing down the signal and using the filter bank at low frequencies. In order to eliminate the mixer and make a silicon-based spectrometer, a high quality factor filter at terahertz frequencies is desirable. However, the quality factor of conventional passive filters is limited to the quality factor of the individual components. As such, the quality factor is low at high frequencies due to ohmic and substrate losses in the associated silicon processes.

Optical prisms with high quality factor filters and demultiplexers have also been realized using, for instance, photonic crystals. In particular, the frequency bandgap of the photonic crystals are engineered to provide a spatial filter, or a superprism, such that different frequencies of a signal propagate in different directions within the crystal. Here, the principle is to employ a periodic structure, such as high-pass two-dimensional (2D) metamaterial lattices, to create a bandgap, and thus, to direct energy through the medium as a function of the signal frequency. However, the light propagation in such crystals is comparable to that found in a diffraction grating, and thus, the dispersion that causes the superprism effect originates from scattering.

In light of the foregoing, there is a need for an apparatus and method for providing a filter for millimeter-wave and terahertz frequencies which exhibits a quality factor that is substantially greater than those of the individual components thereof. Moreover, there is a need for a high quality factor filter that exhibits a negative effective index, directs energy flow as a function of signal frequency at frequencies close to the cut-off frequency, and channels signals from an input to an output.

SUMMARY OF THE DISCLOSURE

In accordance with one aspect of the disclosure, a filter in the form of an electrical prism is provided. The electrical prism or filter comprises a first lattice of inductors and capacitors having at least one input disposed at an input boundary thereof, and a second lattice of inductors and capacitors having a plurality of outputs disposed at an output boundary thereof. The second lattice is configured to form an interface with the first lattice. Furthermore, the first and second lattices are configured to receive a signal at the input of the first lattice, propagate the signal to the interface, and direct the signal to the outputs of the second lattice. The output boundary is configured to compensate for differences in signal attenuation at the outputs.

In accordance with another aspect of the disclosure, an electrical prism or filter is provided. The filter comprises at least one rectangular lattice of inductors and capacitors having at least one input disposed at an input boundary thereof, as well as at least one triangular lattice of inductors and capacitors having a plurality of outputs disposed at an output boundary thereof. The output boundary is configured to compensate for differences in signal attenuation at the outputs. The triangular lattice is configured to form an interface with the rectangular lattice. The inductors of each lattice are serially and linearly disposed within a plane of the respective lattice and disposed along two or more directions so as to intersect at a plurality of intersections. Each capacitor is disposed at an intersection and coupled between the respective intersection and ground. The rectangular and triangular lattices are further configured to receive a signal at the input of the rectangular lattice, propagate the signal to the interface, and direct the signal to the outputs of the triangular lattice. The output boundary is configured to compensate for differences in signal attenuation at the outputs.

In accordance with yet another aspect of the disclosure, a method for filtering signals is provided. The method comprises the steps of providing a rectangular lattice of inductors and capacitors having at least one input disposed at an input boundary thereof; providing a triangular lattice of inductors and capacitors having a plurality of outputs disposed at an output boundary thereof; forming an interface between the rectangular lattice and the triangular lattice; providing a signal to the input of the rectangular lattice; providing one or more equi-phase sources of the signal to be received by the rectangular lattice and propagated to the interface; and directing the signal to the outputs of the triangular lattice such that higher frequency components of the signal propagate to outputs that are relatively closer to the interface. The output boundary is configured to compensate for differences in signal attenuation at the outputs.

These and other aspects of this disclosure will become more readily apparent upon reading the following detailed description when taken in conjunction with the accompanying drawings.

Figure 1:
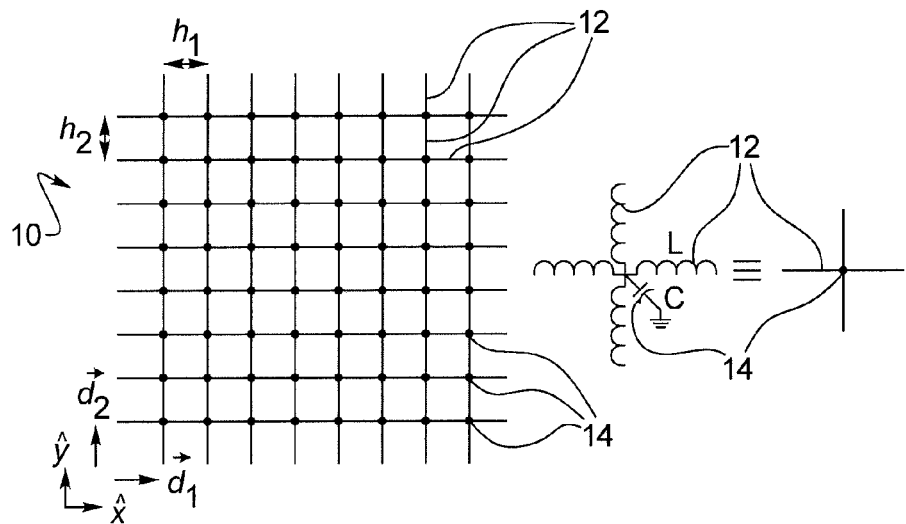
FIG. 1 is a schematic view of a discrete two-dimensional (2D) inductor-capacitor (LC) lattice.

While the present disclosure is susceptible to various modifications and alternative constructions, certain illustrative embodiments thereof have been shown in the drawings and will be described below in detail. It should be understood, however, that there is no intention to limit the present invention to the specific forms disclosed, but on the contrary, the intention is to cover all modifications, alternative constructions, and equivalents falling with the spirit and scope of the present invention.

DETAILED DESCRIPTION

Referring now to FIG. 1, an exemplary two-dimensional (2D) rectangular lattice 10 is provided. Specifically, the 2D lattice 10 may be configured as a discrete electrical lattice 10 comprising passive elements, such as inductors 12, capacitors 14, and the like. In the particular embodiment of FIG. 1, each line may represent an inductor 12 having an inductance value of L, while each dot may represent a capacitor 14 having a capacitance value C. The inductors 12 of the lattice 10 may be serially and linearly disposed within a plane of the lattice 10 and along two or more directions so as to intersect at right angles, or the like, so as to define a series of nodes or intersections. Moreover, a capacitor 14 may be disposed and coupled between the node and ground at each node or intersection. Distances between the capacitors 14 in the $\hat{x}$- and $\hat{y}$-directions may be indicated by $h_1$ and $h_2$, respectively. Accordingly, the coordinate vectors for nodes $\vec{d}_1$ and $\vec{d}_2$, and the position vector $\vec{r}$ may be defined as $$\vec{d}_1 = h_1 \hat{x} \tag{1a}$$

$$\vec{d}_2 = h_2 \hat{y} \tag{1b}$$

$$\vec{r} = l_1 \vec{d}_1 + l_2 \vec{d}_2. \tag{1c}$$

For the lattice 10 defined above, $l_1$ and $l_2$ may be integer numbers. For a plane wave, the voltage at each node may be defined as $$V = A \exp[i(2\pi(\vec{d},\vec{r}) - \omega t)] \tag{2}$$

where $\vec{a}$ may be the wave-vector and $\omega$ may be the angular frequency of the signal. The wave-vector may be directly related to wavelength $\lambda$, and in 2D, may be defined as $$\vec{a} = a_2 \hat{x} + a_2 \hat{y} \tag{3a}$$

$$a_1^2 + a_2^2 = 1/\lambda^2. \tag{3b}$$

Substituting equations (1) and (3) into equation (2), the voltage at each node may be expressed as $$V = A \exp[i(k_1 l_1 + k_2 l_2 - \omega t)] \tag{4}$$

where $k_1$ and $k_2$ may be the phase shifts per section in the $\hat{x}$- and $\hat{y}$-directions, respectively. The values for each of $k_1$ and $k_2$ may be defined by $$k_1 = 2\pi(\vec{a}, \vec{d}_1) = 2\pi a_1 h_1 \tag{5a}$$

$$k_2 = 2\pi(\vec{a}, \vec{d}_2) = 2\pi a_2 h_2 \tag{5b}$$

Figure 2:
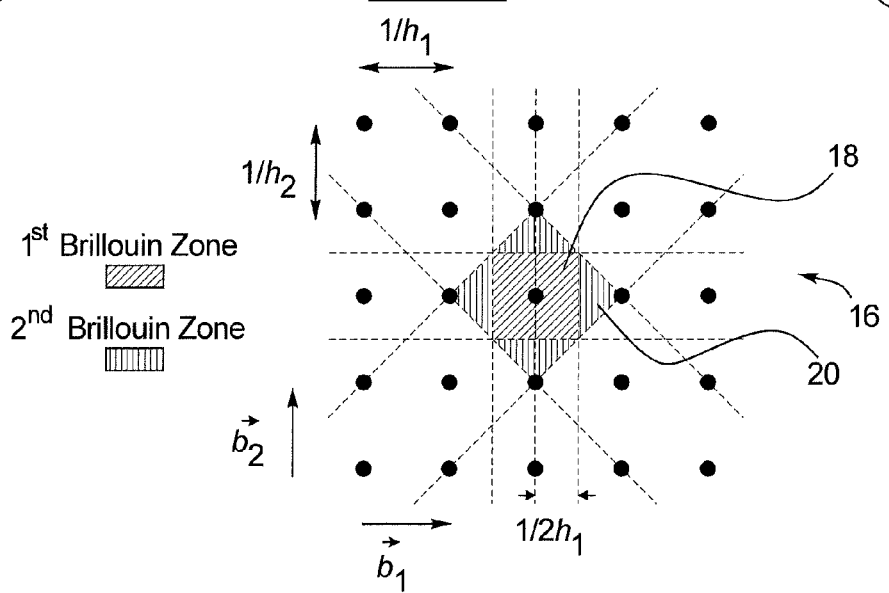
FIG. 2 is a diagrammatic view of the Brillouin zones associated with the reciprocal lattice of a rectangular lattice.

Using such relationships, it may be possible to determine the reciprocal lattice 16, as shown in FIG. 2, for the rectangular lattice 10 of FIG. 1. A reciprocal lattice 16 may be an imaginary lattice in the wave-vector space. As illustrated in FIG. 2, all of the points in the first Brillouin zone 18 of the reciprocal lattice 16 may represent unique $\vec{a}$ vectors. For any point in the second Brillouin zone 20, there may be a corresponding point in the first Brillouin zone 18 which represents the same plane wave. Accordingly, the coordinate vectors for the reciprocal lattice 16 may be given by $$\vec{b}_1 = 1/h_1 \hat{x} \tag{6a}$$

$$\vec{b}_2 = 1/h_2 \hat{y}. \tag{6b}$$

From the reciprocal lattice 16 of FIG. 2, it may be determined that in the first Brillouin zone 18, $a_1$ and $a_2$ have maximum values of $\frac{1}{2}h_1$ and $\frac{1}{2}h_2$, respectively. Accordingly, the maximum values for $k_1$ and $k_2$ may be defined as $$\text{Max}\{k_1\} = 2\pi \text{Max}\{a_1\}h_1 = \pi \tag{7a}$$

$$\text{Max}\{k_2\} = 2\pi \text{Max}\{a_2\}h_2 = \pi \tag{7b}$$

Figure 3:
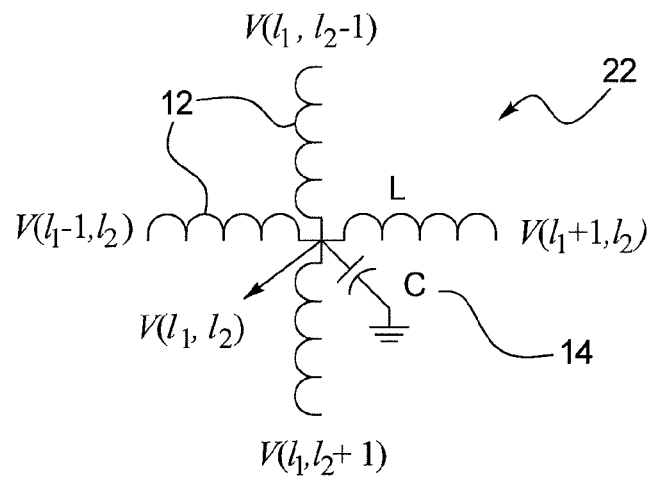
FIG. 3 is a schematic view of a rectangular lattice cell.

In order to determine the direction of the energy in the lattice 10, the dispersion relation of the lattice 10 may be calculated. To calculate the dispersion relation of the lattice 10, a differential equation may be generated based on properties of a unit cell of the rectangular lattice 10, for example, the lattice cell 22 of FIG. 3. Applying Kirchhoff's Voltage and Current Laws to the lattice cell 22 may provide $$LC \frac{d^2 V(l_1, l_2)}{dt^2} = \quad (8)$$
$$V(l_1+1, l_2) + V(l_1-1, l_2) + V(l_1, l_2+1) + V(l_1, l_2-1) - 4V(l_1, l_2).$$

Assuming a plane-wave voltage, as in expression (4), for each of the node voltages in equation (8) may provide $$\omega = \frac{2}{\sqrt{LC}} [\sin^2(k_1/2) + \sin^2(k_2/2)]^{1/2}. \quad (9)$$

Expression (9) may demonstrate the nonlinear relationship between the wave-vector $\vec{a}$ and frequency, which is characteristic of the discrete nature of the lattice 10. Moreover, in electrical lattices 10, one of the phase shift values, $k_1$ or $k_2$, may typically be defined by boundary conditions. As shown in the equi-frequency diagram of FIG. 4, for example, the relationship between the phase shifts, $k_1$ and $k_2$, is illustrated for different frequencies. The dot located in the upper-right corner of the plot may indicate the cut-off frequency of the lattice 10, which may be achieved when each of $k_1$ and $k_2$ reach a maximum value, or $$\omega_{cut} = \frac{2\sqrt{2}}{\sqrt{LC}}. \quad (10)$$

In a 2D lattice 10, the cut-off frequency may be a function of the direction of the wave-vector. The cut-off frequency in equation (10), for instance, may be the highest frequency that can propagate in the lattice 10, and at a particular cut-off frequency, the wave-vector $\vec{a}$ may have a direction of, for example, $\angle \hat{a} = \pi/4$ if $h_1 = h_2$. As applied to comparable CMOS processes, wherein transmission lines may be used as inductors and metal-to-metal capacitance may be used as capacitors, the corresponding inductance L and capacitance C values may be as low as 20 pH and 5 fH, respectively. Below such values, the inductance L and capacitance C values may be dominated by parasitics.

In a lossless lattice 10, the flow direction of energy may be the same as that of the group velocity. From relationship (9) above, the group velocity may be determined as $$\vec{V}_g = \nabla_{\frac{k_1}{h_1}, \frac{k_2}{h_2}} \omega = h_1 \frac{\sin k_1}{\omega LC} \hat{x} + h_2 \frac{\sin k_2}{\omega LC} \hat{y}. \quad (11)$$

From the group velocity of equation (11), the flow direction of energy may be determined to be $$\text{Energy Direction} = \angle \vec{V}_g = \tan^{-1}\left(\frac{h_2 \sin k_2}{h_1 \sin k_1}\right). \quad (12)$$

Figure 4:
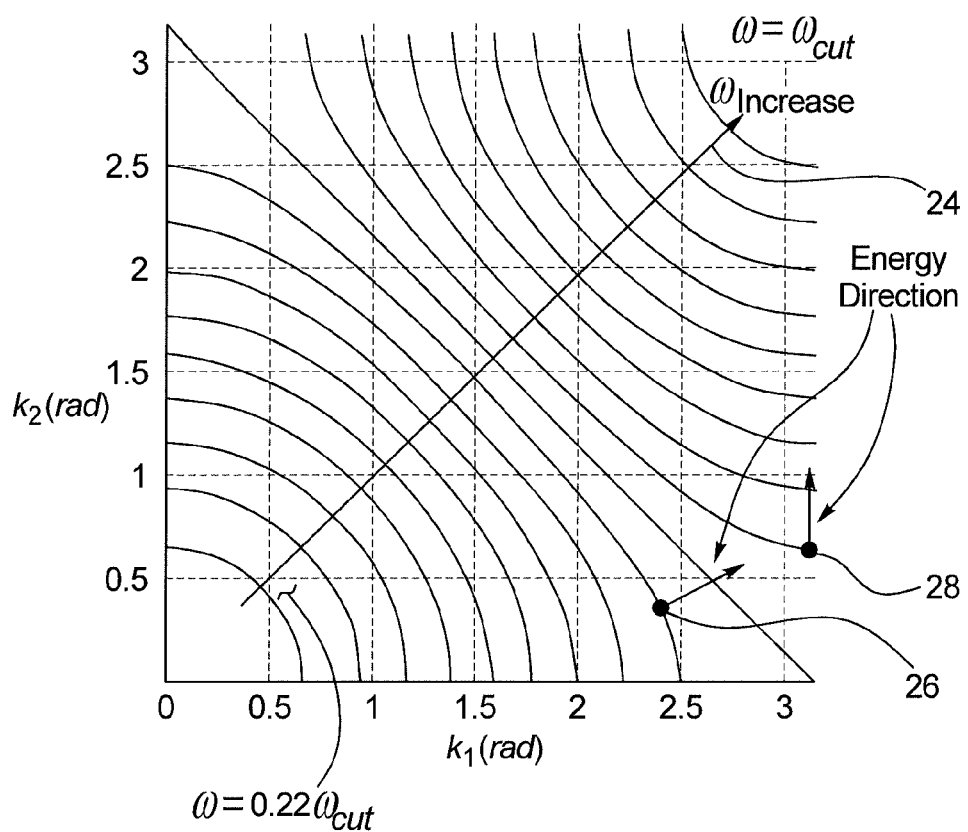
FIG. 4 is a graphical view of the equi-frequency curves associated with a rectangular lattice.

When $h_1 = h_2$, by definition, the group velocity direction is the direction of the line perpendicular to the equi-frequency curves, as indicated by line 24 in FIG. 4 for instance. At low frequencies, phase shifts $k_1$ and $k_2$ may be small and the equi-frequency curves may more closely conform to the shape of a circle. Accordingly, the energy direction may approximate the direction of the wave-vector $\vec{a}$, or the phase velocity direction. For example, the direction of energy at arbitrary points 26, 28 on the equi-frequency curves of FIG. 4 may be indicated by their associated arrows. Furthermore, if the phase shifts $k_1$ and $k_2$ are positive, or if $\vec{a}$ has a positive phase between 0 and $\pi/2$, the group velocity $\vec{V}_a$ may also have a phase between 0 and $\pi/2$. This may be due to the fact that the rectangular lattice 10 has a positive effective index over all of the frequencies. Any positive incident angle may result in a positive transmission angle in such a lattice 10.

Figure 5:
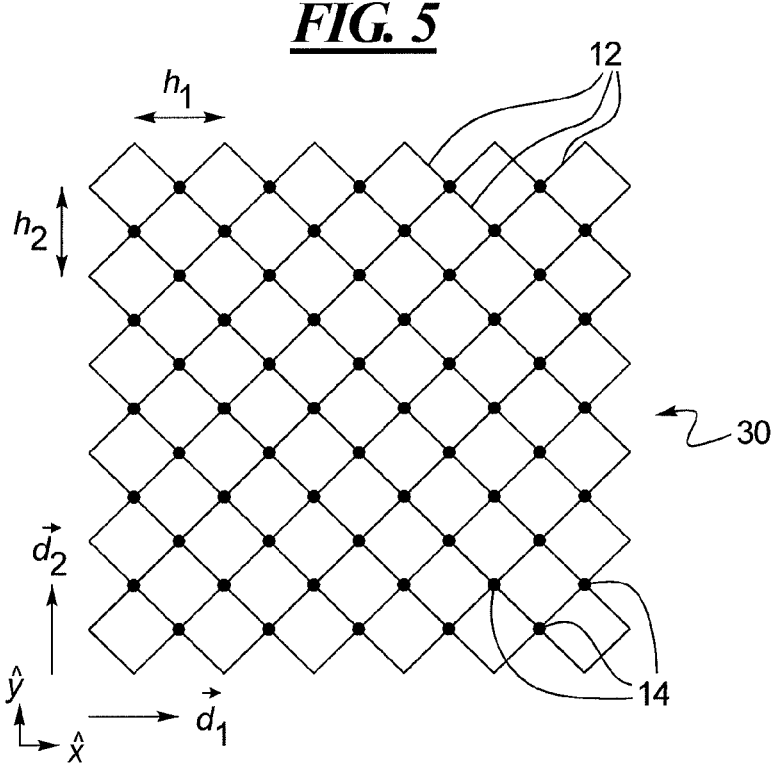
FIG. 5 is schematic view of a discrete 2D triangular LC lattice.

Turning now to FIG. 5, a right isosceles triangular lattice 30 having a 45° rotation of a square lattice is provided. A square lattice may essentially be defined as a symmetrical rectangular lattice 10, wherein $h_1 = h_2$. In FIG. 5, $\vec{d}_1$ and $\vec{d}_2$ may be the basis vectors and $h_1$ and $h_2$ may be the node distances in the $\hat{x}$- and $\hat{y}$-directions, respectively. Accordingly, analyses of the triangular lattice 30 may substantially parallel those pertaining to the rectangular lattice 10 of FIG. 1, except in equation (1c), wherein $l_1$ and $l_2$ may no longer represent integers. In order to address all of the nodes with the specified basis vectors, $l_1$ and $l_2$ may be defined as $$\vec{r} = l_1 \vec{d}_1 + l_2 \vec{d}_2 \quad (13a)$$

$$l_1 = n/2 \; l_2 = m/2; \; n,m = \text{both odd or even}. \quad (13b)$$

Figure 6:
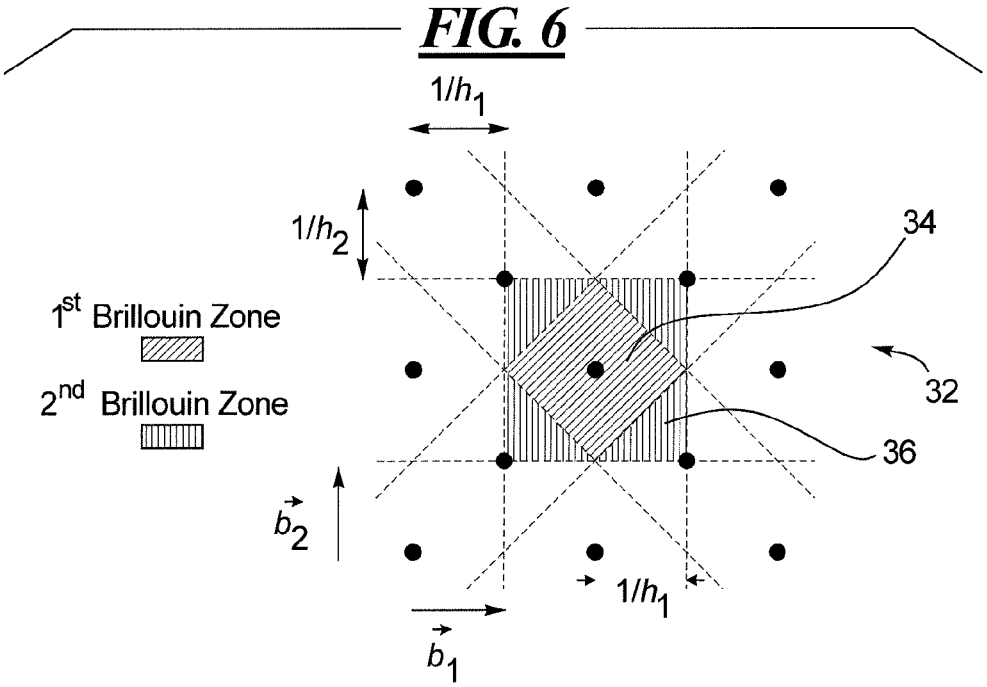
FIG. 6 is a diagrammatic view of the Brillouin zones associated with the reciprocal lattice of a triangular lattice.

As with the rectangular lattice 10 of FIG. 1, information pertaining to the triangular lattice 30 may be used to determine a corresponding reciprocal lattice 32, as shown for example in FIG. 6. Moreover, the reciprocal lattice 32 of FIG. 6 may be provided by first and second Brillouin zones 34, 36. The first Brillouin zone 34 may include maximum $a_1$ and $a_2$ values of $1/h_1$ and $1/h_2$, respectively. By further implementing equation (5), the maximum values for $k_1$ and $k_2$ in the first Brillouin zone 34 may be $$\text{Max}\{k_1\} = 2\pi \text{Max}\{a_1\} h_1 = 2\pi \quad (14a)$$

$$\text{Max}\{k_2\} = 2\pi \text{Max}\{a_2\} h_2 = 2\pi. \quad (14b)$$

Figure 7:
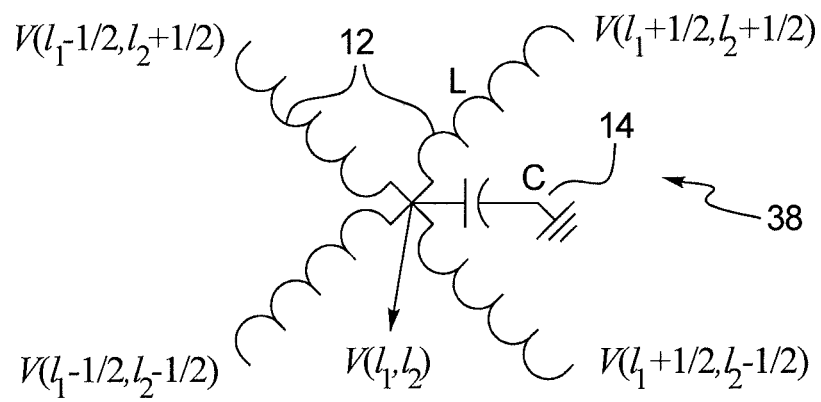
FIG. 7 is a schematic view of a triangular lattice cell.

Referring now to FIG. 7, the unit cell of the triangular lattice 30, or the triangular lattice cell 38, is provided. Using the triangular lattice cell 38 and the relationship of equation (4) for a plane wave, the dispersion relation for a triangular LC lattice may be derived as $$\omega = \frac{2}{\sqrt{LC}} \left[ \sin^2\left(\frac{k_1+k_2}{4}\right) + \sin^2\left(\frac{k_1-k_2}{4}\right) \right]^{1/2}. \quad (15)$$

Figure 8:
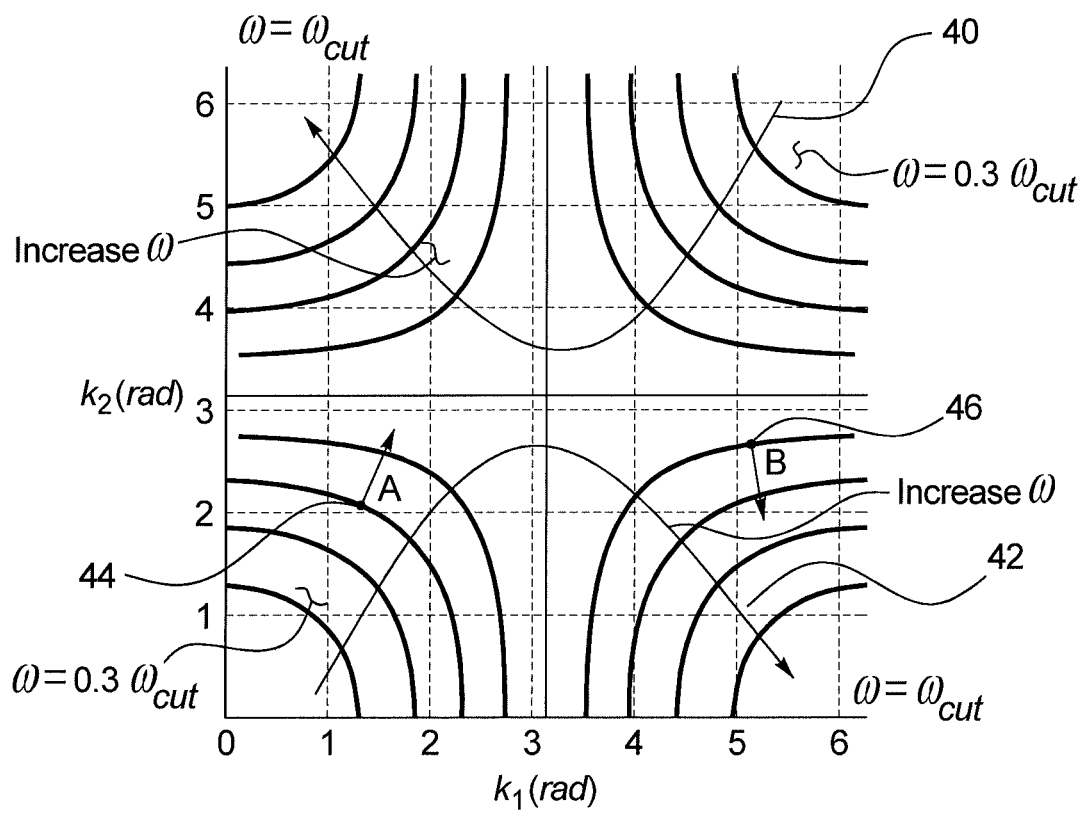
FIG. 8 is a graphical view of the equi-frequency curves associated with a triangular lattice.

As shown, the cut-off frequency may be the same as in equation (10). However, when the lattice 30 is rotated by 45°, for example, $\angle \vec{a} = 0$, or $\pi/2$ rather than $\pi/4$ in a square lattice at the cut-off frequency. Using relationship (15), the equi-frequency diagram corresponding to the triangular lattice 30 may be obtained. As shown in FIG. 8, the triangular lattice 30 may include two solutions for $k_1$ and $k_2$ for each frequency. The two solutions may be represented, for example, by curves 40, 42, wherein each may progress from a point where $\omega = 0.3\omega_{cut}$, at the upper-right or lower-left of FIG. 8, and end at a point where $\omega = \omega_{cut}$, at the lower-right or upper-left of FIG. 8.

Following relationships (15) and (11), the direction of energy in the triangular lattice 30 may be defined to be $$\angle \vec{V}_g = \tan^{-1}\left(\frac{\sin\left(\frac{k_1+k_2}{2}\right) - \sin\left(\frac{k_1-k_2}{2}\right)}{\sin\left(\frac{k_1+k_2}{2}\right) + \sin\left(\frac{k_1-k_2}{2}\right)}\right). \quad (16)$$

For example, the direction of energy at arbitrary points 44, 46 on the equi-frequency curves of FIG. 8 may be indicated by their associated arrows. More specifically, the direction of energy for the first operating point 44, or the wave-vector phase $\angle \vec{a}$ thereof, may be between 0 and $\pi/2$. Accordingly, at operating point 44, the triangular lattice 30 may have a positive effective index, which may remain true as long as $k_1$ and $k_2$ values are less than . However, if either $k_1$ or $k_2$ value exceeds $\pi$, then for positive wave-vector phase $\angle \vec{a}$, group velocity $\vec{V}_a$ may be negative. This may further suggest a negative effective index for the triangular lattice 30. For example, the triangular lattice 30 may have such a negative effective index at the second arbitrary operating point 46 of FIG. 8.

Figure 9:
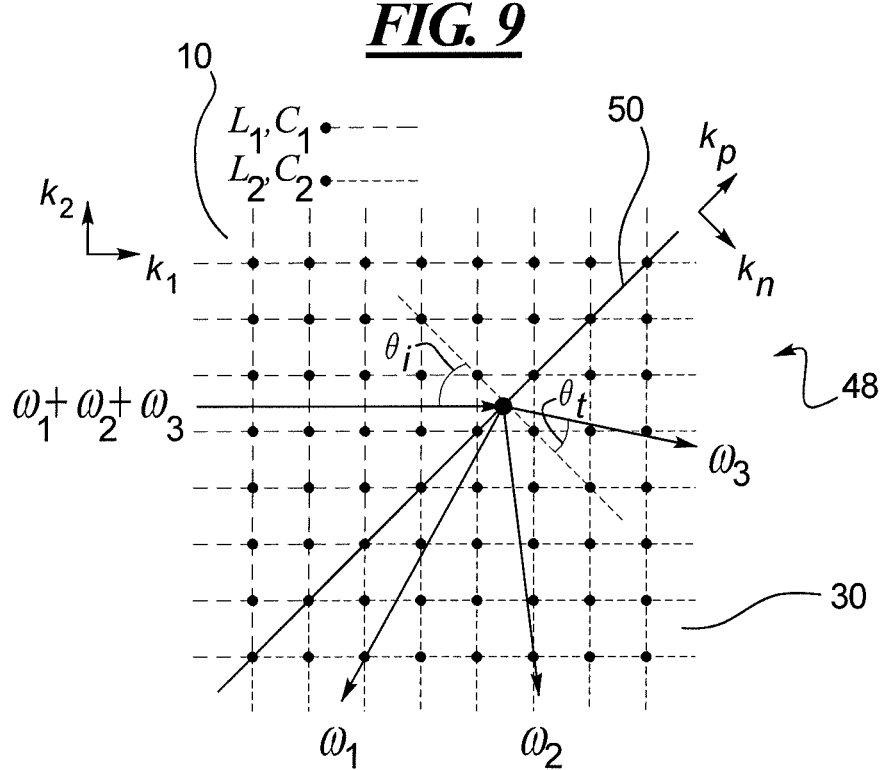
FIG. 9 is a schematic view of an exemplary electrical prism constructed in accordance with the teachings of the disclosure.

Turning to FIG. 9, an exemplary electrical prism or filter 48 that is constructed in accordance with the teachings of the disclosure is provided. Specifically, the electrical prism 48 may include a rectangular lattice 10 that is coupled to a triangular lattice 30 at an interface 50, wherein the triangular lattice 30 may be rotated at an angle of 45°. As shown, the interface 50 may be configured so as to form a 45° interface 50 between the rectangular and triangular lattices 10, 30. While other interface angles between the rectangular and triangular lattices 10, 30 may be possible, actual implementation of such electrical prisms or filters 48 may prove to be unsuitable for on-chip realization. As shown, a plane wave may flow from left to right in the rectangular lattice 10 having an incident angle $\theta i$ of 45° at the interface 50. Using such an incident angle may eliminate the need for wideband phase shifters at the boundary, and further, may lead to a simpler realization. Furthermore, values $k_1$ and $k_2$ of FIG. 9 may denote the phase shifts per section of the rectangular lattice 10 in the $\hat{x}$- and $\hat{y}$-directions, respectively, while $k_p$ may denote the phase shift per section along the interface 50 and $k_n$ may denote the phase shift per section perpendicular to the interface 50 in the triangular lattice 30. In each of the rectangular and triangular lattices 10, 30, the distance between the respective capacitors 14 may be assumed to be $h_1 = h_2$.

Using the diagram of FIG. 9 and the known incident angle of $\theta i = 45°$, the phase shift per section along the $\hat{y}$-direction in the rectangular lattice 10 may be determined to be $k_2 = 0$. The phase shift per section along the $\hat{x}$-direction in the rectangular lattice 10, or $k_1$, may be determined from equation (9) to be $$k_1 = 2\sin^{-1}(\omega\sqrt{L_1C_1}/2). \quad (17)$$

As the traveling signal may be a plane wave, the phase shift $k_1$ may also be representative of the phase shift between the consecutive nodes at the interface 50. With respect to the triangular lattice 30, the value of $k_p$ may represent the phase shift per section along the interface 50, and thus, $k_1$ may be determined to be equal to $k_p$. By combining the relationships of (15) and (17), $k_n$ may be defined as $$k_n = 2\cos^{-1}\left(\frac{1 - L_2C_2\omega^{2/4}}{\cos(\sin^{-1}(\omega\sqrt{L_1C_1}/2))}\right). \quad (18)$$

The relationships of equations (17) and (18) above may be used to define kp and kn as a function of lattice components 12, 14 and the signal frequency. Further, the values of k1 and k2 of equation (16) may be substituted by kn and kp, respectively, so as to determine the transmission angle $\theta t$.

Figure 10:
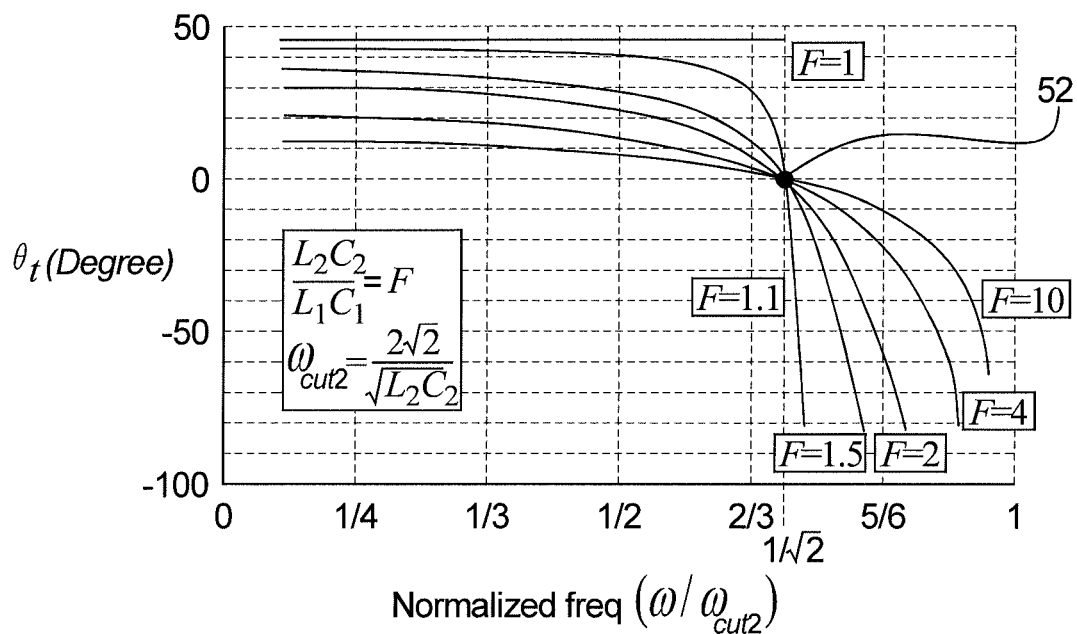
FIG. 10 is a graphical view of signal transmission angle as a function of frequency associated with the electrical prism of FIG. 9.

Turning now to FIG. 10, an exemplary plot of the transmission angle $\theta_t$ as a function of frequency for different lattice components is provided. Moreover, the lattice components may be represented by a factor F, wherein $F = L_2C_2/L_1C_1$. In order to minimize any reflections from the interface 50, the characteristic impedance of both rectangular and triangular lattices 10, 30 may be made equal. The characteristic impedance may be a function of the direction of propagation of the plane wave, and if close to the cut-off frequency, may also be a function of the signal frequency. For a rectangular lattice 10, for instance, if the propagation direction is along the $\hat{x}$ or $\hat{y}$ axis, the characteristic impedance may be $$\sqrt{\frac{L}{C}}$$

for low-signal frequencies. Accordingly, if the characteristic impedance of both rectangular and triangular lattices 10, 30 are kept constant at, for example, 50$\Omega$, then $$Z_c = \sqrt{\frac{L_1}{C_1}} = \sqrt{\frac{L_2}{C_2}} = 50\Omega.$$

The corresponding cut-off frequency of the triangular lattice 30, $\omega_{cut2}$, as illustrated in FIG. 10, may then be determined to be as high as, for example, 1.4 GHz, further demonstrating how the filter formed by the electrical prism 48 can operate at terahertz frequencies.

Still referring to the plot of FIG. 10, the transmission angle $\theta_t$ and the derivative thereof may be shown to become more negative as frequency increases for a specific F factor, which may suggest that the separation of the frequencies increases at higher frequencies. Increased frequency separations may also be observed for lower F factors, as indicated by the corresponding curves of FIG. 10. For an output of the filter that is fixed to a point on the triangular lattice 30, increased frequency separation may translate into a higher quality factor for the filter. Furthermore, the frequency corresponding to the point 52 at which all the curves intersect may be observed as the cut-off frequency of the triangular lattice 30 when the signal is traveling in the $\hat{x}$- or $\hat{y}$-direction in FIG. 10. This may be demonstrated by the curve corresponding to where factor F=1, which suggests that the signal stops propagating at the same frequency. The negative effective index may also be observed by the 45° incident angle and the negative transmission angle. Moreover, for low frequencies, the transmission angle may reach a constant number, which may also be the exact angle that is determined by Snell's law where $$\frac{\sin\theta_i}{\sin\theta_t} = \frac{n_2}{n_1} = \frac{\sqrt{L_2C_2}}{\sqrt{L_1C_1}} = \sqrt{F}. \quad (19)$$

This may further establish that while refraction may be the dominating factor in determining the direction of the energy at low frequencies, dispersion may be the dominating factor in determining the direction of energy as frequency increases and as the wavelength becomes comparable to the dimensions of the particular lattice 10, 30.

Figure 11:
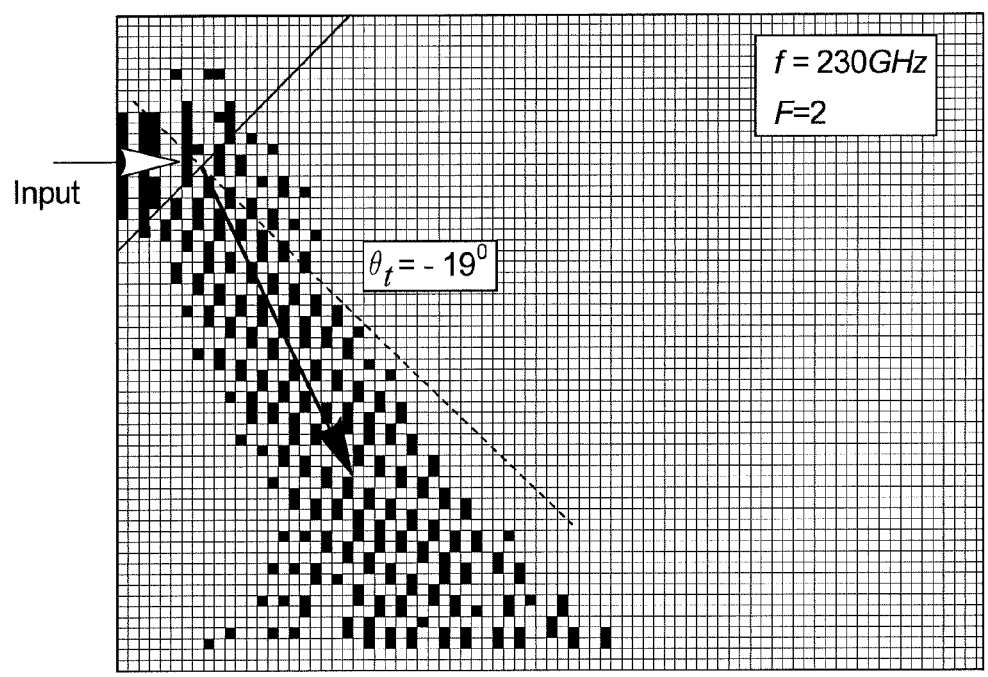
FIG. 11 is a diagrammatic view of signal propagation through an electrical prism.

Turning now to FIG. 11, a simulated profile of a signal propagating through the rectangular and triangular lossless lattices 10, 30 of an electrical prism 48 is provided. More specifically, ten equi-phase sources may be applied to an input located on the left side of the rectangular lattice 10 to generate a plane wave. The combination of the lattices 10, 30 may be substantially large, for example, having 60×80 sections, or the like. In the particular embodiment of FIG. 11, the signal frequency may be 230 GHz while the F factor may be 2. Further, the characteristic impedance of both lattices 10, 30 may be 50Ω while the cut-off frequency of the triangular lattice 30 may be 300 GHz. Accordingly, $L_2$ and $C_2$ may be determined to be 75 pH and 30 fF, respectively. The direction of propagation or angle of transmission, as illustrated in FIG. 11, may be defined to be the direction that the maximum amplitude is traveling, for example, $\theta_t=-19°$, which is comparable to the theoretical transmission angle of $\theta_t=-20°$, as determined with respect to FIG. 10. Similar comparisons between simulated and theoretical transmission angles at other frequencies may result in transmission angles which differ only by ±1° or so. Such differences may be explained by an error in measuring the simulated transmission angle.

The simulation of FIG. 11 may further demonstrate the channeling properties of the electrical prism 48. In particular, as the frequency approaches the cut-off frequency, the signal may be shown to channel to a specific direction within the electrical prism 48 rather than propagating unbiased therethrough. Similarly, if the frequency was much lower than the cut-off frequency, as soon as the wave reaches the interface 50, all of the nodes would act as point sources and a considerable amount of energy would spread to the output nodes. As the cut-off frequency is a function of the direction of energy, signals which propagate in directions other than those corresponding to high frequencies may simply diminish at a comparably faster rate. Such properties significantly affect the quality factor of the filter formed by the electrical prism 48. While the width of the signal ray may be defined as the extent to which the amplitude drops 3 dB from the maximum thereof, the simulated signal ray of FIG. 11, having a frequency close to the cut-off frequency and propagating through lossless lattices 10, 30, may be shown to have a width which remains substantially constant from the interface 50 to the output thereof.

Figure 12:
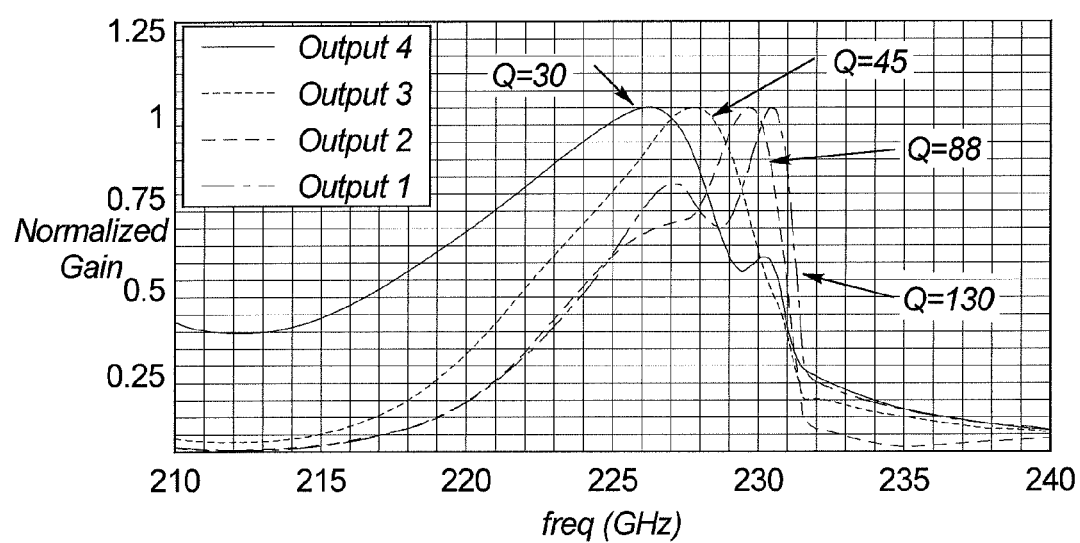
FIG. 12 is a graphical view of the normalized gain from input to output for an electrical prism.

Further analyses of the rectangular and triangular lattices 10, 30 of FIG. 9 may be required in order to determine the quality factor thereof. As in the particular analysis of FIG. 12, the LC section quality factor may be chosen to be the typical on-chip value of 10 at 230 GHz and the F factor may be chosen to be 1.2. The outputs of the filter may be defined as four fixed points at the boundary of the triangular lattice 30. According to the normalized gain from input to output for the different output nodes of FIG. 12, a filter quality factor of 130 may be achievable, which is substantially greater than the component quality factor of 10. Notably, such quality factors are not possible to achieve using classical filter designs and methods.

For a given LC section quality factor Q, the quality factor of the filter may be a function of the size of the lattices 10, 30. More particularly, an increase in the size of the lattices 10, 30 may correspond to greater frequency separations, and thus, an improved quality factor of the filter overall. Although insertion loss may increase with lattice size, the effective size of the lattices 10, 30 may be scaled down as the operating frequency increases. Moreover, the inductance of a lattice 10, 30 may decrease in value to accommodate the higher frequencies, and thus, reduce the size of the inductors 12 and the overall lattice 10, 30. Such a lattice configuration may be ideal for high-frequency filtering applications as the quality factor Q of the individual components and the size of the lattices 10, 30 decrease.

Figure 13:
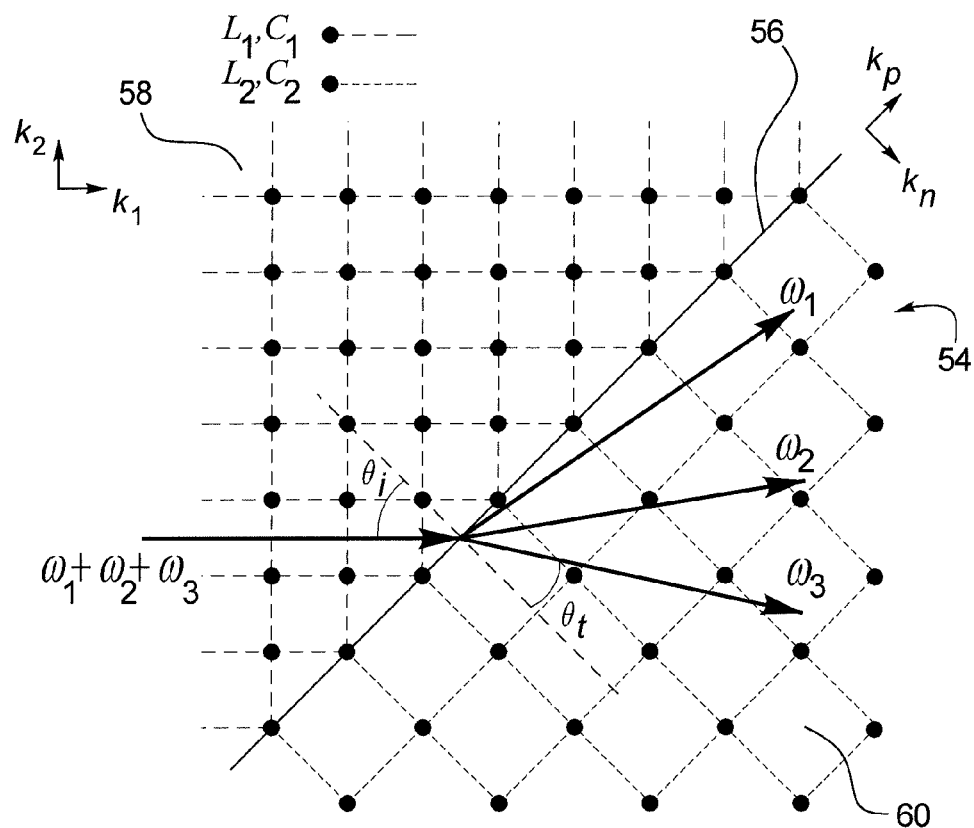
FIG. 13 is a schematic view of another electrical prism having two rectangular lattices.

Referring now to FIG. 13, another exemplary electrical prism or filter 54 is provided. As in previous embodiments, the electrical prism 54 may be constructed by interfacing, for instance, two lattices 58, 60 at a 45° interface 56, or the like. Unlike the electrical prism 48 of FIG. 9, however, both lattices 58, 60 of the electrical prism 54 of FIG. 13 may be rectangular forms. Overall, the theoretical analyses of the electrical prism 54 of FIG. 13 may be comparable to those associated with the electrical prism 48 of FIG. 9. However, as the electrical prism 54 incorporates two rectangular lattices 58, 60, there may be no associated negative effective index. Accordingly, at low frequencies, the transmission angle $\theta_t$ may be a constant positive value, and as the operating frequency increases, the transmission angle $\theta_t$ and the slope of the corresponding curves may be more positive. The overall filtering and channeling properties may still remain.

As compared to the electrical prism 48 of FIG. 9, the electrical prism 54 of FIG. 13 may be associated with some drawbacks. For example, as the electrical prism 54 of FIG. 13 does not have a negative transmission angle, the span of the transmission angle over the frequency range may be less than that of the electrical prism 48 of FIG. 9, which may further lead to a lower quality factor. Furthermore, as the configuration of inductors 12 and capacitors 14 of the electrical prism 48 of FIG. 9 is uniform and without a 45° change in direction at the interface 50 thereof, terahertz on-chip implementation of the electrical prism 54 of FIG. 13 may be more involved.

Figure 14:
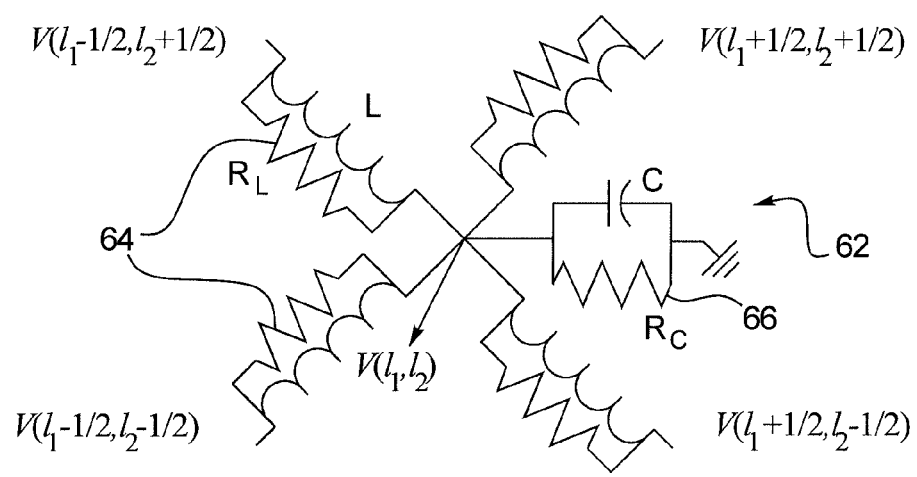
FIG. 14 is a schematic view of a lossy triangular lattice cell.

In order to examine the effect of component loss on the quality factor of the filter formed by the electrical prism 48 of FIG. 9, for example, it may be necessary to determine the effect of component loss on the direction of the energy and the channeling characteristics of a signal propagating therethrough. To determine the effect of component loss on the direction of energy, the dispersion relation of the lattices 10, 30 may be examined. In order to determine the dispersion relation of the lattices 10, 30, it may be necessary to observe a lossy unit cell of the triangular lattice 30, or triangular lattice cell 62, as shown in FIG. 14, for instance. For examination purposes, the lossy triangular lattice cell 62 may include inductors 12 of inductance L, capacitors 14 of capacitance C, and resistors 64, 66 associated with each of the inductors 12 and capacitors 14 having resistances of $R_L$ and $R_C$, respectively. By altering the resistance values $R_L$ and $R_C$ of the resistors 64, 66, the quality factor of the inductors 12 and capacitors 14 may be controlled independently. The dispersion relation for the lossy triangular lattice 62 may be determined as in previous analyses with the exception that the voltage at each node may be defined as $$V = A\exp[-(a_1 l_1 + a_2 l_2)]\exp[i(k_1 l_1 + k_2 l_2 - \omega t)]. \tag{20}$$

Here, the values $a_1$ and $a_2$ may represent attenuation constants in the $\hat{x}$- and $\hat{y}$-directions, respectively, because the inductors 12 may have the same inductance L throughout the triangular lattice 30, where $a = a_1 = a_2$. Using relationship (20), the dispersion relation for a lossy triangular lattice 30 may be determined by $$\omega^2 = \frac{4 - (e^{-\alpha} + e^{\alpha})\left(\cos\left(\frac{k_1 + k_2}{2}\right) + \cos\left(\frac{k_1 - k_2}{2}\right)\right)}{CL + \frac{L^2}{R_L R_C} \frac{4L^2}{R_L^2} - } \quad (21)$$

$$\frac{L^2(e^{-\alpha} + e^{\alpha})\left(\cos\left(\frac{k_1 + k_2}{2}\right) + \cos\left(\frac{k_1 - k_2}{2}\right)\right)}{R_L^2}.$$

For verification, equation (21) may be applied for a lossless case where $R_L$ and $R_C$ approach infinity to result in equation (15) previously obtained.

Figure 15:
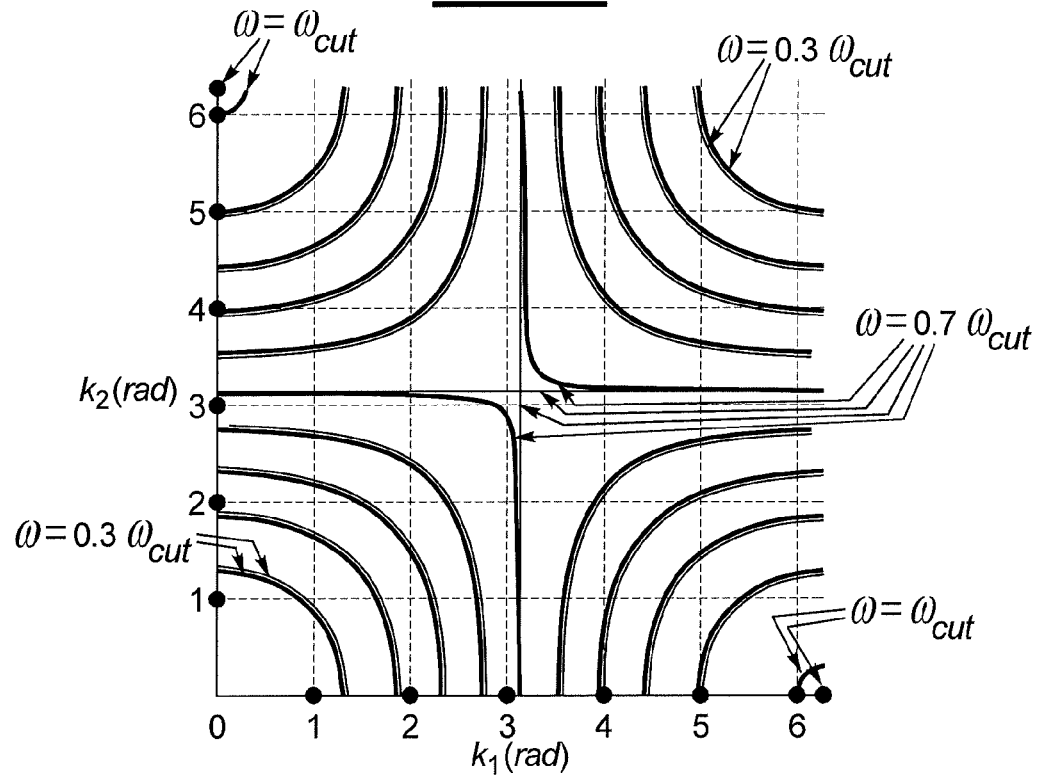
FIG. 15 is a graphical view of the equi-frequency curves associated with lossy and lossless triangular lattices.

Furthermore, equation (21) may be used to generate an equi-frequency diagram for a lattice composed of lossy triangular lattice cells 62, as shown by the dashed curves of FIG. 15, as compared to that of a lattice composed of lossless triangular lattice cells 38, as shown by the solid curves of FIG. 15. The cut-off frequencies of the two lattice types diagrammed in FIG. 15 may be the same, for example, 300 GHz. The inductance L and capacitance C values of both diagrammed lattice types may also be 75 pH and 30 fF, respectively, so as to exhibit equal characteristic impedance values of 50Ω. The quality factors of the inductors 12, $Q_L$, and the capacitors 14, $Q_C$, may be selected to reflect typical on-chip values of, for example, 10 and 100, respectively. The resistance values for $R_L$ and $R_C$ may therefore change for each frequency so as to maintain the chosen quality factor values of $Q_L$ and $Q_C$ for the inductors 12 and the capacitors 14. As the quality factor of the inductors 12 is much smaller than the quality factor of the capacitors 14, the LC section quality factor may be approximately the same as $Q_L$=10. While the theoretical cut-off frequency for equation (10) was chosen to be 300 GHz, the actual or observed cut-off frequency of the lossy lattice type may be more than that of the lossless lattice type. This may be illustrated by the comparison of FIG. 15, wherein the dashed curves corresponding to the lossy lattice type no longer exhibits a single point where $\omega = \omega_{cut}$. The new cut-off frequency of the lossy lattice type may be determined by substituting $k_1 = 2\pi$ and $k_2 = 0$ into equation (21).

As with previous embodiments, the direction of the energy may be the direction of the line perpendicular to the curves in the corresponding equi-frequency diagram. As FIG. 15 illustrates, most of the dashed and solid curves corresponding to the lossy and lossless lattice types, respectively, may be very similar to one another. More specifically, as the influences of such losses are added, the equi-frequency curves may slightly shift to where the lower-frequency curves used to be in the lossless lattice types. Accordingly, the direction of energy may not change significantly for most of the operating frequencies. However, points located close to the center of the diagram of FIG. 15 may see substantial changes in the direction of the energy with the addition of such losses. In the diagram of FIG. 15, these points may correspond to where $\omega = 0.7\omega_{cut} = 210$ GHz, which may further correspond to the cut-off frequency of the triangular lattice 30 when the wavevector phase $\angle \vec{a} = \pi/4$. Furthermore, the plots of FIGS. 10 and 12 may indicate that all of the operating frequencies of the filter of the electrical prism 48 with a high quality factor have a frequency greater than 210 GHz. As such, the direction of the energy for the frequencies of interest may substantially be unaffected by component loss.

Figure 16:
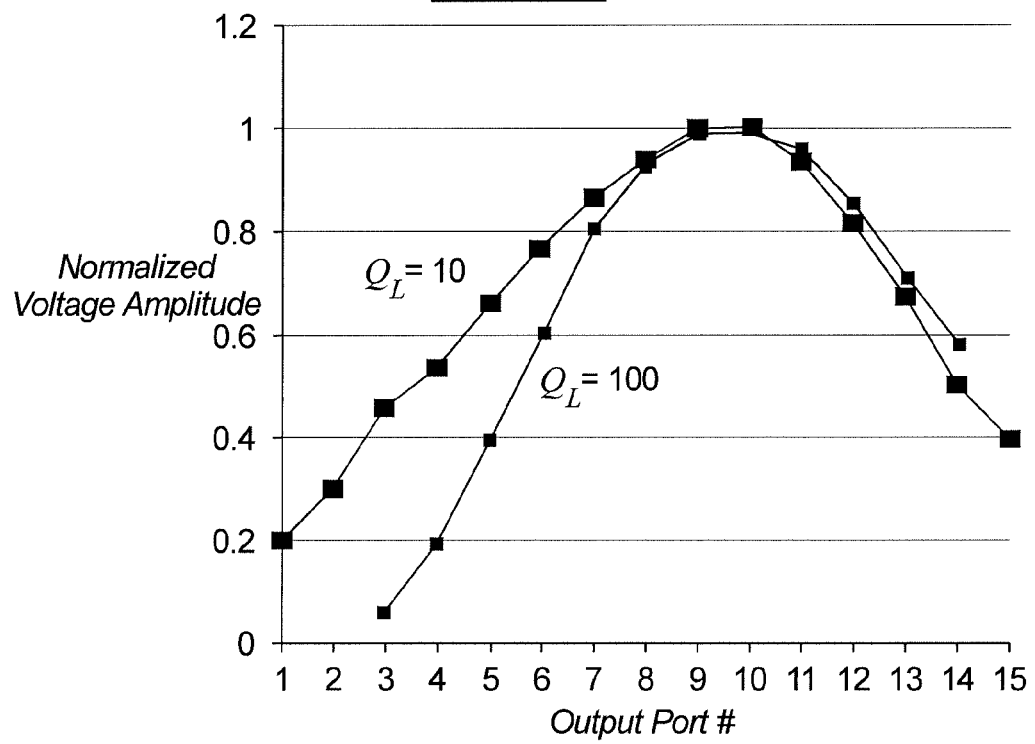
FIG. 16 is a graphical view of normalized voltage amplitudes for different outputs of a triangular lattice.

In order to determine the effect of component loss on the channeling properties of an electrical prism 48, the width of a particular signal ray may be examined. More specifically, the effect of component loss on the width of the signal ray may be observed more easily by a comparison of two or more filters having different LC section quality factors, as shown in FIG. 16. The quality factor of the capacitors 14 may be maintained at a relatively high value so as to let the quality factor of the inductors 12 dominate. In the particular comparison of FIG. 16, the signal frequency may be 230 GHz while the F factor may be 1.2. As with previous analyses, the inductance $L_2$ and the capacitance $C_2$ may be 75 pH and 30 fF, respectively. As shown in FIG. 16, the resulting plots of the normalized voltage amplitudes for different outputs at the boundary may indicate that the narrower voltage profile corresponds to the signal ray that is subjected to more channeling. Accordingly, it can be shown the higher component quality factor may result in a narrower signal profile, and thus, provides more channeling.

Figure 17:
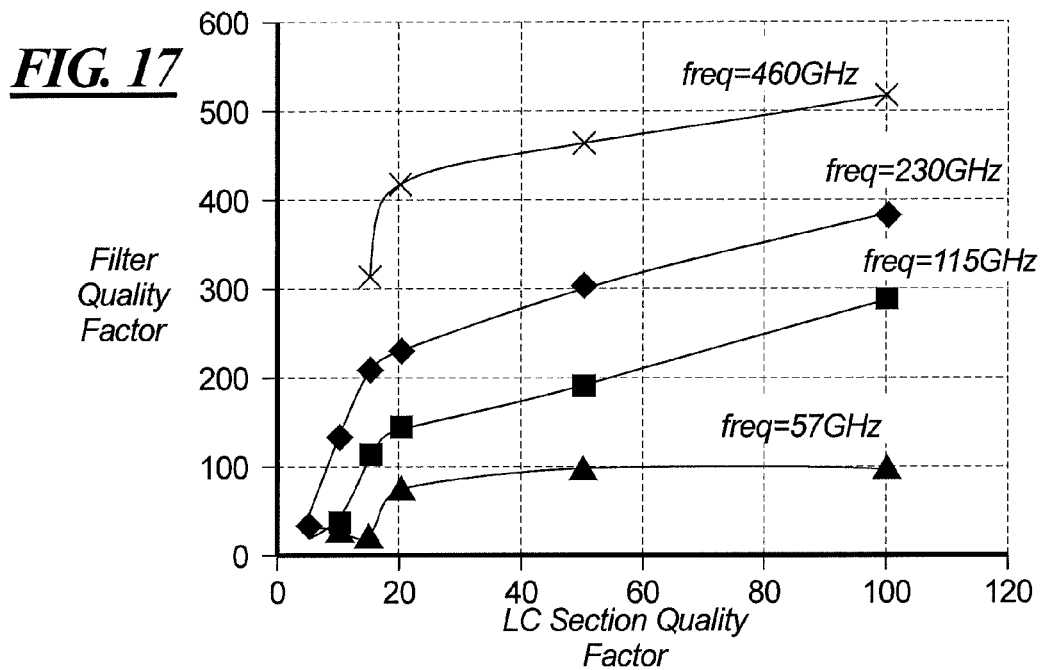
FIG. 17 is a graphical view of filter quality factor as a function of component quality factor for a triangular lattice.

The effect of component quality factor on the overall filter quality factor may also be observed. As shown in FIG. 17, the quality factor of a filter is provided as a function of the LC section quality factor for different frequency bands. As with previous models, the LC product ratio for two lattices, or the F factor, may be maintained at 1.2. At the operating frequency of 230 GHz, the inductance $L_2$ and capacitance $C_2$ values may be 75 pH and 30 fF, respectively. For the operating frequencies of 460 GHz, 115 GHz and 57 GHz, the inductance $L_2$ and capacitance $C_2$ values may be multiplied by half, two and four, respectively. All other variables, including the lattice size, may be kept constant. Accordingly, the number of sections may be reduced for lower frequencies so as to keep the same die size. For example, 95×35 sections may be used for 460 GHz, 60×30 sections may be used for 230 GHz, 38×25 sections may be used for 115 GHz, and 25×20 sections may be used for 57 GHz, and the like. As shown in FIG. 17, for a constant LC quality factor, the quality factor of the filter may decrease as the frequency decreases. This may be due to the observed decreases in channeling in response to increased component loss. The results of FIG. 17 may also suggest that a quality factor of 420 is attainable at 460 GHz with a LC section quality factor of 20. The curve associated with the 460 GHz operating frequency where the LC section quality factor is less than 15 may be omitted as the number of sections, for example, 95 sections, in this frequency range may be too large. Particularly, loss associated with component quality factors less than 15 may be so high that the filter may not function properly. Accordingly, a smaller lattice size may be used to provide a filter capable of operating at a frequency of 460 GHz with a component quality factor of less than 15. Moreover, the analyses of FIG. 17 may suggest that, for a constant die size, higher frequency filters may result in higher quality factors for the filters. The analyses of FIG. 17 may further suggest that a higher quality factor boost ratio, or the ratio of the filter quality factor to the component quality factor, may be attained for component quality factors less than 20.

Figure 18:
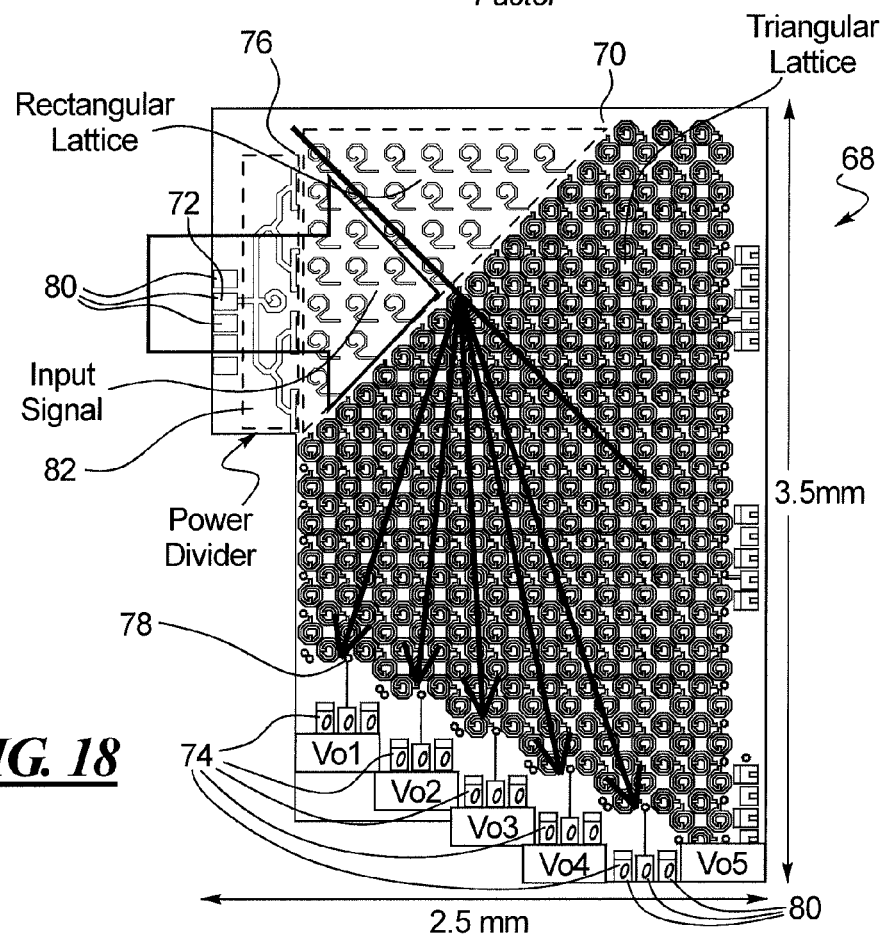
FIG. 18 is a schematic view of another electrical prism as implemented on a die.

Turning to FIG. 18, a schematic of an exemplary electrical prism or filter 68 is provided having a rectangular lattice 10 and a triangular lattice 30, as implemented on a die. As with previous embodiments, the electrical prism 68 may include a rectangular lattice 10 and a triangular lattice 30, wherein the rectangular lattice 10 may be configured to form a 45° interface 70 with the triangular lattice 30. Alternatively, the electrical prism 68 may be implemented using different lattice combinations and other suitable interface configurations. The electrical prism 68 may be implemented using, for example, a 0.13 μm CMOS process with seven metal layers, or any other suitable process. As determined from previous analyses, for a constant filter quality factor, the size of a particular lattice 10, 30 may decrease as the operating frequency decreases. As such, the lattice size may be minimized by selecting the highest possible frequency. For the particular implementation associated with the embodiment of FIG. 18, a maximum frequency of 50 GHz may be selected for relatively easier measurement setup as compared to that of higher frequencies. High quality factor inductors 12, for example, 100 μm×100 μm spiral inductors 12, may be used for each of the rectangular and triangular lattices 10, 30. The die size may be, for example, 3.5 mm×2.5 mm, which along with the configuration of inductors 12 may define the number of sections to be 18×11 for the overall electrical prism 68.

The LC section quality factor may be limited to the quality factor of the inductors 12 in the 50 GHz frequency range. At such a frequency and for the particular implementation process of FIG. 18, the typical quality factor for the spiral inductors 12 may be approximately 20. Referring back to the 57 GHz curve of FIG. 17, an inductor quality factor of 20 may result in a filter quality factor of 70. However, the frequency and lattice size of the implementation of FIG. 18 are less than those corresponding to the 57 GHz curve of FIG. 17. Therefore, the filter quality factor associated with the electrical prism 68 of FIG. 18 may be less than 70 even if the F factor is the kept the same at F=1.2. While the theoretical relationships of FIG. 10 may indicate that a lower F factor will result in a higher filter quality factor, an F factor of less than 1.2 may prove to be unsafe as the filter operation may become too sensitive to process variations.

The analyses of FIG. 10 may further suggest that, for F=1.2, adequate filtering may occur approximately between $0.7 = \omega_{cut}$ and $0.8\omega_{cut}$ since the maximum measurable frequency is 50 GHz, or $0.8\omega_{cut}$=50 GHz. Accordingly, the cut-off frequency of the triangular lattice 30 may be approximately 60 GHz. A cut-off frequency of 60 GHz and a characteristic impedance of 50Ω may correspond to an inductor size of 375 pH for the triangular lattice 30. In the implementation of the electrical prism 68 of FIG. 18, the quality factor of a 375 pH inductor 12 may be approximately 10 at 50 GHz. In order to reduce the loss of the triangular lattice 30, the characteristic impedance may be reduced to approximately 30Ω, which may further correspond to an inductor size of 230 pH and a quality factor of approximately 20.

Still referring to FIG. 18, the electrical prism 68 may structurally include at least one input 72 for receiving an input signal and at least one corresponding output 74. More specifically, the input 72 may be disposed at a border, or input boundary 76, of the rectangular lattice 10 while the output 74 may be disposed at a border, or output boundary 78, of the triangular lattice 30. Each of the inputs 72 and outputs 74 may be implemented using ground-signal-ground (GSG) pads 80, or the like, disposed along the respective boundaries 76, 78. In order to observe the signals at the input 72 and output 74 of the electrical prism 68, impedance-matching circuits configured to match 30-50Ω may be used. The electrical prism 68 may further include a power divider 82, such as a wideband one-to-eight power divider 82 configured to generate eight equiphase sources at the input 72 of the rectangular lattice 10. Alternatively, the electrical prism 68 may variably employ different lattice combinations as well as other suitable input and/or output configurations.

The eight signal sources provided by the power divider 82 at the input 72 of the electrical prism 68 of FIG. 18 may prove to be sufficient for generating a plane wave through the rectangular lattice 10. More specifically, a 50 GHz input signal source may be applied to the rectangular lattice 10 through the GSG pads 80 of the input 72. The inductors 12 of the triangular lattice 30 may be configured to be 230 pH spiral inductors 12 having a quality factor of 20, or the like. The capacitors 14 of the triangular lattice 30 may be configured to be 250 fF metal-oxide semiconductor (MOS) capacitors 14 so as to result in a quality factor of 80 for a 50 GHz signal. The electrical prism 68 of FIG. 18 may include a maximum of five outputs 74, and thus, five GSG pads 80 disposed along the output boundary 78 of the triangular lattice 30, through which output signals may be observed. The number of outputs 74 for an electrical prism 68 may depend upon the size of the particular lattice 30, the size of the associated die, the configuration of the input and/or output nodes 72, 74, the size of the GSG pads 80, and the like.

As shown in FIG. 18, the electrical prism 68 may be configured such that the higher frequency signals are directed toward $V_{o1}$ and the lower frequency signals are directed toward $V_{o5}$. In observing the output signals, the attenuation constant for the higher frequency signals at $V_{o1}$ may be determined to be greater than that of the lower frequency signals at $V_{o5}$. To compensate for this difference and to equalize the voltage amplitudes at the different outputs 74, the output boundary 78 of the triangular lattice 30 may be modified. Moreover, for those signals of higher frequency and greater attenuation, the distance extending from the interface 70 to the respective outputs 74 may be shortened, as shown by the angled output boundary 78 in FIG. 18. As shown in previous analyses with respect to FIG. 17, having a low F factor may not significantly improve the filter quality factor when the number of sections in the lattice and the component quality factor are both low. Accordingly, the F factor may be optimized to obtain smooth filtering properties without sacrificing the filter quality factor. The resulting inductance and capacitance values for the rectangular lattice 10 may be $L_1$=145 pH and $C_1$=150 fF, respectively. Implementation may further be simplified by removing any vertical and/or horizontal sections from the rectangular lattice 10 that are not being used or not carrying a signal.

Figure 19:
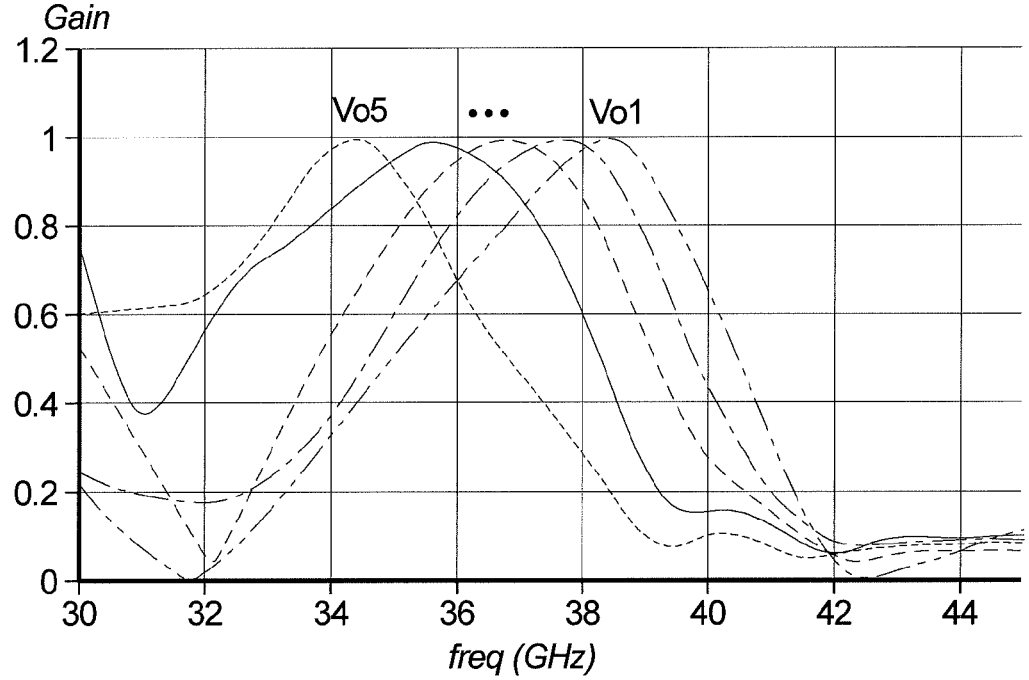
FIG. 19 is a graphical view of theoretical gain from the input to each output of the electrical prism of FIG. 18.

Referring now to FIG. 19, simulation results for the output signals $V_{o1}$-$V_{o5}$ of the electrical prism 68 of FIG. 18 are provided. Moreover, the graph of FIG. 19 may provide the normalized gain from the input 72 to each output 74 as a function of signal frequency. As shown, all of the peaks for the output voltages $V_{o1}$-$V_{o4}$ may be within 20% of that of the signal of highest frequency, $V_{o5}$. This agreement may be a result of the shortening or angling modification of the output boundary 78 of the triangular lattice 30. The results of FIG. 19 may also indicate peak values for output voltages $V_{o1}$ and $V_{o5}$ to occur at frequencies of 38.5 GHz and 34.5 GHz, respectively. The analyses of FIG. 19 may serve to illustrate the filtering behavior of the electrical prism 68, and further, to verify the negative effective index for the electrical prism 68. The filter quality factors of the electrical prism 68 may vary from 8 to 12 for the different output signals, which may be due to the differences in the filter quality factor for each output signal. The results may also suggest the effect of all parasitic inductors 12 and capacitors 14 within the layout of the electrical prism 68. The insertion loss from each source at the input boundary 76 to each output 74 at the output boundary 78 may be approximately 20 dB.

Figure 20:
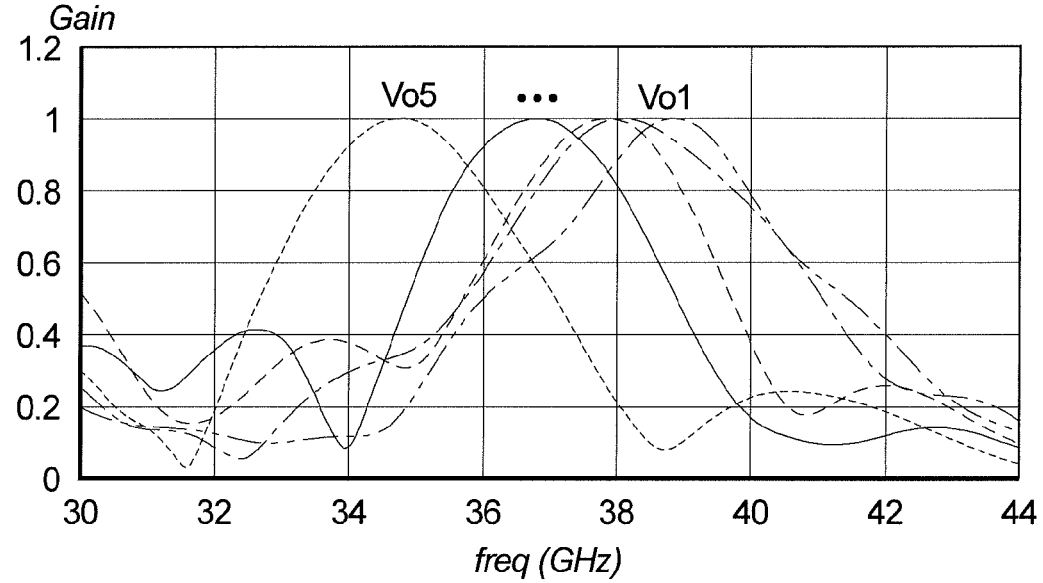
FIG. 20 is a graphical view of measured gain from the input to each output of the electrical prism of FIG. 18.

Turning to FIG. 20, measurement results for the output signals $V_{o1}$-$V_{o5}$ of the electrical prism 68 of FIG. 18 are provided. Specifically, the graph of FIG. 20 may provide the normalized gain from the input 72 to each output 74, as observed with respect to signal frequency. As shown, the measured results of FIG. 20 may be substantially identical to the theoretical results of FIG. 19. The peaks for the different outputs 74 may be distributed over a 4 GHz span as in the simulation of FIG. 19. Similarly, all of the peaks for the output voltages $V_{o1}$-$V_{o4}$ may be within 20% of that of the signal of highest frequency, $V_{o5}$. The filter quality factors may also be very close to the corresponding simulation result, and further, may vary between 8 and 12 for the different output signals.

Based on the foregoing, it can be seen that the disclosed method and apparatus provides a high quality factor filter in the form of an electrical prism or filter for operating in millimeter-wave and terahertz frequencies. The electrical prism exhibits a quality factor that is significantly greater than the quality factor of the individual components thereof. The high quality factor filter further exhibits a negative effective index, directs energy flow as a function of signal frequency at frequencies close to the cut-off frequency, and effectively channels signals from an input to an output with minimized losses.

What is claimed is:

1. A filter, comprising:
a first lattice of inductors and capacitors having at least one input disposed at an input boundary thereof; and
a second lattice of inductors and capacitors having a plurality of outputs disposed at an output boundary thereof, the second lattice being configured to form an interface with the first lattice, the first and second lattices being configured to receive a signal at the input of the first lattice, propagate the signal to the interface, and direct the signal to the outputs of the second lattice, the output boundary being configured to compensate for differences in signal attenuation at the outputs.

2. The filter of claim 1, wherein the inductors of each lattice are serially and linearly disposed within a plane of the respective lattice and disposed along two or more directions so as to intersect at a plurality of intersections, and the capacitors are disposed at the intersections and coupled between the respective intersections and ground.

3. The filter of claim 1, wherein each output is associated with a different frequency of the signal.

4. The filter of claim 1 having a factor $F=L_2C_2/L_1C_1$ of no more than 10, wherein $L_1$ is an inductance of an inductor in the first lattice, $L_2$ is an inductance of an inductor in the second lattice, $C_1$ is a capacitance of a capacitor in the first lattice, and $C_2$ is a capacitance of a capacitor in the second lattice.

5. The filter of claim 1, wherein the output boundary is angled such that, for signals of higher frequencies, a travel distance from the interface to the respective output is reduced.

6. The filter of claim 1, wherein each of the first and second lattices is a rectangular lattice.

7. The filter of claim 1, wherein the first lattice is a rectangular lattice and the second lattice is a triangular lattice.

8. The filter of claim 1, wherein the interface forms a 45° angle with each of the first and second lattices.

9. The filter of claim 1 further comprising a power divider disposed along the input boundary configured to generate a plurality of equi-phase sources from the signal received at the input of the first lattice.

10. The filter of claim 1, wherein the filter is implemented in a complementary metal-oxide semiconductor (CMOS) process.

11. A filter, comprising:
at least one rectangular lattice of inductors and capacitors having at least one input disposed at an input boundary thereof; and
at least one triangular lattice of inductors and capacitors having a plurality of outputs disposed at an output boundary thereof, the output boundary being configured to compensate for differences in signal attenuation at the outputs, the triangular lattice being configured to form an interface with the rectangular lattice, the inductors of each lattice being serially and linearly disposed within a plane of the respective lattice and disposed along two or more directions so as to intersect at a plurality of intersections, each of the capacitors being disposed at the intersections and coupled between the respective intersection and ground, the rectangular and triangular lattices being configured to receive a signal at the input of the rectangular lattice, propagate the signal to the interface, and direct the signal to the outputs of the triangular lattice.

12. The filter of claim 11, wherein each output is associated with a different frequency of the signal.

13. The filter of claim 11, wherein the output boundary of the second lattice is angled such that, for signals of higher frequencies, a travel distance from the interface to the respective output is reduced.

14. The filter of claim 11, wherein the interface forms a 45° angle with each of the first and second lattices.

15. The filter of claim 11 having a factor $F=L_2C_2/L_1C_1$ of no more than 10, wherein $L_1$ is an inductance of an inductor in the rectangular lattice, $L_2$ is an inductance of an inductor in the triangular lattice, $C_1$ is a capacitance of a capacitor in the rectangular lattice, and $C_2$ is a capacitance of a capacitor in the triangular lattice.

16. The filter of claim 11, wherein the capacitors are metal-oxide semiconductor (MOS) capacitors.

17. The filter of claim 11, wherein each of the inputs and outputs includes a ground-signal-ground (GSG) pad.

18. The filter of claim 11 further comprising a power divider disposed along the input boundary configured to generate a plurality of equi-phase sources from the signal received at the input of the first lattice.

19. The filter of claim 11, wherein the filter is implemented in a complementary metal-oxide semiconductor (CMOS) process.

20. A method for filtering signals, comprising the steps of:
providing a rectangular lattice of inductors and capacitors having at least one input disposed at an input boundary thereof;
providing a triangular lattice of inductors and capacitors having a plurality of outputs disposed at an output boundary thereof, the output boundary being angled to compensate for differences in signal attenuation at the outputs;
forming an interface between the rectangular lattice and the triangular lattice;
providing a signal to the input of the rectangular lattice;
providing one or more equi-phase sources of the signal to be received by the rectangular lattice and propagated to the interface; and
directing the signal to the outputs of the triangular lattice such that higher frequency components of the signal propagate to outputs that are relatively closer to the interface.

* * * * *